(12) United States Patent
Amirsolaimani (10) Patent No.: US 12,366,744 B2
(45) Date of Patent: Jul. 22, 2025

(54) 3D MAPPING IN 2D SCANNING DISPLAY

(71) Applicant: Meta Platforms Technologies, LLC, Menlo Park, CA (US)

(72) Inventor: Babak Amirsolaimani, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 705 days.

(21) Appl. No.: 17/502,864

(22) Filed: Oct. 15, 2021

(65) Prior Publication Data

US 2023/0043439 A1 Feb. 9, 2023

Related U.S. Application Data (60) Provisional application No. 63/230,355, filed on Aug. 6, 2021.

(51) Int. Cl.
*G02B 26/10* (2006.01)
*G02B 27/01* (2006.01)

(52) U.S. Cl.
CPC ......... *G02B 26/103* (2013.01); *G02B 26/101* (2013.01); *G02B 27/0172* (2013.01); *G02B 2027/0138* (2013.01)

(58) Field of Classification Search
CPC .............. G02B 26/103; G02B 26/101; G02B 27/0172; G02B 2027/0138; G02B 26/0833; G02B 27/0081; G02B 2027/0134

See application file for complete search history.

(56) References Cited

U.S. PATENT DOCUMENTS

| | | | |
|---|---|---|---|
| 11,158,126 B1 * | 10/2021 | Petrov | G06F 3/012 |
| 2002/0175880 A1 | 11/2002 | Melville et al. | |
| 2012/0274745 A1 | 11/2012 | Russell | |
| 2022/0146740 A1 * | 5/2022 | Koshelev | G02B 6/29331 |

FOREIGN PATENT DOCUMENTS

| | | |
|---|---|---|
| EP | 3500887 A1 | 6/2019 |
| WO | 2018034959 A1 | 2/2018 |

OTHER PUBLICATIONS

International Search Report and Written Opinion for International Application No. PCT/US2022/039663, mailed Nov. 22, 2022, 10 pages.
International Preliminary Report on Patentability for International Application No. PCT/US2022/039663, mailed Feb. 15, 2024, 9 pages.

* cited by examiner

*Primary Examiner* — Luke D Ratcliffe
(74) *Attorney, Agent, or Firm* — Morgan, Lewis & Bockius LLP (57) ABSTRACT

A wearable display device includes a light source, a beam scanner, a pupil-replicating lightguide, and a detector. The light source is configured to emit an image beam and a ranging beam. The beam scanner co-scans both beams. The image beam is used to form an image in angular domain for displaying to a user of the wearable display device, and a ranging beam is used to scan outside environment at the same time. Light reflected from objects in the outside environment is detected by the detector, and a 3D map of the outside environment is built using time-of-flight measurements of the reflected signal and/or triangulation. For triangulation measurements, the detector may include a digital camera.

20 Claims, 10 Drawing Sheets

3D MAPPING IN 2D SCANNING DISPLAY

REFERENCE TO RELATED APPLICATION

This application claims priority from US Provisional Patent Application No. 63/230,355 entitled "3D MAPPING IN 2D SCANNING DISPLAY", filed on Aug. 6, 2021 and incorporated herein by reference in its entirety.

TECHNICAL FIELD

The present disclosure relates to wearable displays, and in particular to wearable displays using scanning projectors.

BACKGROUND

Head mounted displays (HMD), helmet mounted displays, near-eye displays (NED), and the like are being used increasingly for displaying virtual reality (VR) content, augmented reality (AR) content, mixed reality (MR) content, etc. Such displays are finding applications in diverse fields including entertainment, education, training and biomedical science, to name just a few examples. The displayed VR/AR/MR content can be three-dimensional (3D) to enhance the experience and to match virtual objects to real objects observed by the user. Eye position and gaze direction, and/or orientation of the user may be tracked in real time, and the displayed imagery may be dynamically adjusted depending on the user's head orientation and gaze direction, to provide an experience of immersion into a simulated or augmented environment.

Compact display devices are desired for wearable displays. Because a display of HMD or NED is worn on the head of a user, a large, bulky, unbalanced, and/or heavy display device would be cumbersome and may be uncomfortable for the user to wear.

Projector-based displays provide images in angular domain, which can be observed by a user's eye directly, without an intermediate screen or a display panel. An imaging waveguide may be used to extend image light carrying the image in angular domain over an eyebox of the display. The lack of a screen or a display panel in a scanning projector display enables size and weight reduction of the display, and enables AR applications. Projector-based displays may use a scanning projector that obtains image in angular domain by scanning an image light beam of a controllable brightness and/or color.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1 and 6A to 6C, similar reference numerals denote similar elements.

A near-eye display based on a scanning projector uses a tiltable reflector to scan a beam of image light across field of view (FOV) of the near-eye display. Optical power level and/or color composition of the image light are varied in coordination with the scanning to raster an AR/VR image in angular domain for direct observation by a user. An imaging waveguide, e.g. a pupil-replicating waveguide, may be used to convey the scanned light beam to the user's eye, and to spread the scanned light beam laterally for convenience of eye positioning relative to the display.

A near-eye display may include an optical ranging device, which is used to gather information about surroundings of the near-eye display user. The information being collected may include distance to surrounding objects, their shape, position, orientation, color, reflectivity, polarization properties, etc. To provide such information, the optical ranging device may scan a light beam, e.g. an infrared (IR) light beam invisible to a human viewer, and monitor in real time a magnitude of reflection of the ranging light beam. The reflection may be captured in a time-resolved manner to determine the distance to the object based on the time it took the ranging light pulse to arrive to the photodetector.

In accordance with this disclosure, a ranging device of a near-eye display may use a same beam scanner as the one used to render the displayed AR/VR image, providing significant space and cost savings. To that end, the light source may provide image light and ranging light beams co-scanned by the scanner, e.g. by directing both beams onto a same tiltable reflector of the scanner.

In accordance with the present disclosure, there is provided a wearable display device comprising a first light source for providing a first image beam and a first ranging beam, and a first beam scanner coupled to the first light source. The first beam scanner includes a tiltable reflector. The tiltable reflector is configured for receiving and angularly scanning the first image beam to obtain a first image in angular domain, and for receiving and angularly scanning the first ranging beam, whereby the first ranging beam scans outside environment. The wearable display device further includes a first pupil-replicating lightguide coupled to the first beam scanner for conveying portions of the first image beam scanned by the first beam scanner to a first eyebox of the wearable display device, and a first detector for receiving a portion of the first ranging beam reflected from an object in the outside environment.

The wearable display device may further include a controller operably coupled to the first light source, the first beam scanner, and the first detector. The controller may be configured to operate the first beam scanner, cause the first light source to provide the first image beam having at least one of a time-varying power level or a time-varying color composition to provide the first image in angular domain as the first image beam is scanned by the first beam scanner, and to receive a first signal from the first detector, the first signal being representative of the portion of the first ranging beam reflected by the object. The controller may be configured to cause the first light source to provide the time-variant first ranging beam. The controller may be further configured to determine a distance to the object from at least one of time or phase relationship between the time-variant first ranging beam and the first signal. In embodiments where the time-variant first ranging beam includes a succession of ranging light pulses, the controller may be configured to determine the distance to the object from a time delay between emitting a pulse of the ranging light pulses and receiving the first signal.

In some embodiments, the first detector is disposed at a base distance from the first beam scanner. The first detector may include an objective for focusing the first ranging beam portion at a focal plane and a photodetector array at the focal plane for detecting the focused first ranging beam portion. The controller may be further configured to determine the distance to the object from position of the focused first ranging beam portion on the photodetector array and the base distance. For example, the controller may be configured to determine a beam angle of the received first ranging beam portion from the position of the focused first ranging beam portion, and to determine the distance by triangulation based on a beam angle of the first ranging beam, the beam angle of the received first ranging beam portion, and the base distance.

In some embodiments, the first detector includes a polarization component comprising at least one of a polarizer or a waveplate, configured to receive the reflected portion of the first ranging beam; and a photodetector optically coupled to the polarization component.

The wearable display device may further include a second light source for providing a second image beam and a second ranging beam, and a second beam scanner coupled to the second light source for receiving and angularly scanning the second image beam to obtain a second image in angular domain, and for receiving and angularly scanning the second ranging beam, whereby the second ranging beam scans the outside environment. A second pupil-replicating lightguide may be coupled to the second beam scanner for conveying the second image beam to a second eyebox of the wearable display device. The first detector may be disposed between the first and second beam scanners, and may be configured for receiving a portion of the second ranging beam reflected from the object.

The controller may be configured to operate the first and second beam scanners, cause the first and second light sources to provide the first and second image beams, respectively, having at least one of a time-varying power level or a time-varying color composition to provide the first and second images in angular domain, respectively, as the first and second image beams are scanned by the first and second beam scanners, respectively. The controller may be configured to receive first and a second signals from the first detector, the first and second signals being representative of the reflected portions of the first and second ranging beams, respectively. The controller may be further configured to discriminate between the first and second signals based on timing of the first and second signals w.r.t timing of emitting the first and second ranging beams.

In embodiments where the wearable display device includes a second detector for receiving a portion of the second ranging beam reflected from the object, the controller may be configured to operate the first and second beam scanners to cause the first and second light sources to provide the first and second image beams, respectively, with at least one of a time-varying power level or a time-varying color composition to provide the first and second images in angular domain, respectively, as the first and second image beams are scanned by the first and second beam scanners, respectively. The controller may be further configured to receive first and second signals from the first and second detectors, respectively, the first and second signals being representative of the reflected portions of the first and second ranging beams, respectively.

In accordance with the present disclosure, there is provided a multi-beam scanner comprising a light source for providing an image beam in a visible wavelength range and a ranging beam in an infrared wavelength range, and a first beam scanner coupled to the light source. The first beam scanner comprises a tiltable reflector for receiving and angularly scanning the image beam to obtain an image in angular domain, and for receiving and angularly scanning outside environment with the ranging beam. The multi-beam scanner may further include an IR-pass optical filter downstream of the first beam scanner, for transmitting the ranging beam toward the outside environment and blocking the image beam from reaching the outside environment. The multi-beam scanner may further include a pupil-replicating lightguide coupled to the first beam scanner for providing multiple offset portions of the scanned image beam to a viewer.

In accordance with the present disclosure, there is further provided a method for displaying an image to a viewer while scanning outside environment. The method includes using a light source for providing an image beam and a ranging beam; tilting a tiltable reflector of a beam scanner to angularly scan the image beam to obtain an image in angular domain, and to angularly scan the ranging beam to scan outside environment; using a pupil-replicating lightguide coupled to the beam scanner for conveying portions of the image beam scanned by the beam scanner to an eyebox of a wearable display device; and using a detector for receiving a portion of the ranging beam reflected from an object in the outside environment. Using the light source to provide the image beam may include causing the light source to provide the image beam with at least one of a time-varying power level or a time-varying color composition, to provide the image in angular domain as the image beam is angularly scanned by the beam scanner. Using the detector for receiving the portion of the ranging beam may include receiving a signal representative of the reflected portion of the ranging beam.

In some embodiments, the method further includes pulsing the ranging beam and determining a distance to the object from a time relationship between the signal and the pulsed ranging beam. In embodiments where the detector is disposed at a base distance from the beam scanner, and where the detector comprises an objective for focusing the ranging beam portion at a focal plane and a photodetector array at the focal plane for detecting the focused ranging beam portion, the method may further include determining the distance to the object from position of the focused ranging beam portion on the photodetector array, and from and the base distance.

Figure 1:
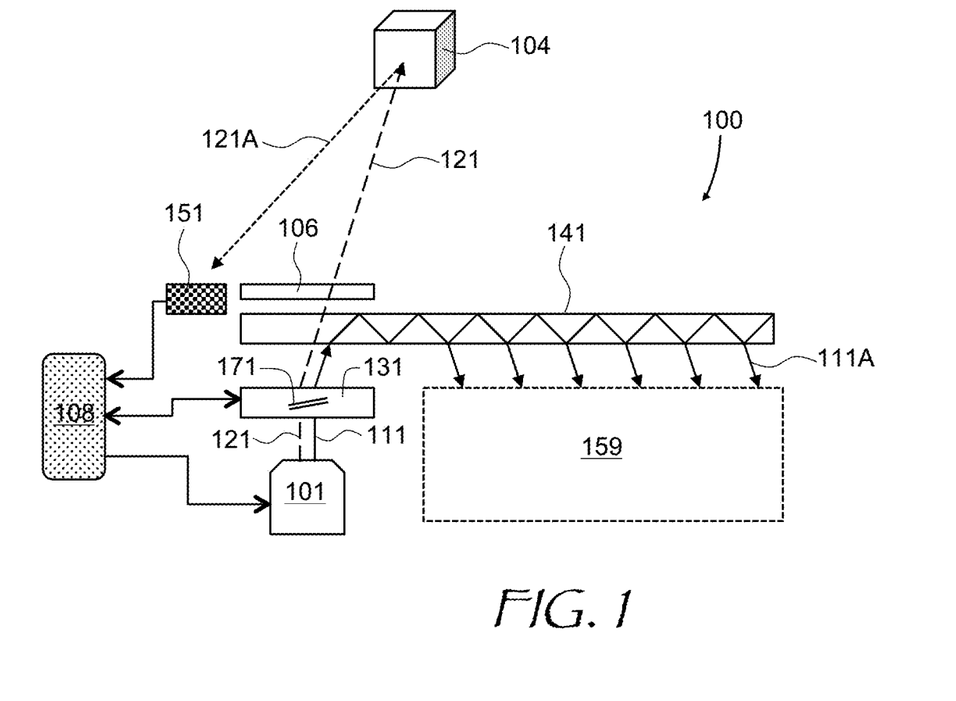
FIG. 1 is a side schematic view of a wearable display device of this disclosure.

Referring now to FIG. 1, a wearable display device 100 includes a light source 101 for providing an image beam 111 in a visible wavelength range, and a ranging beam 121, typically of invisible light such as an infrared light, for example. A beam scanner 131 is coupled to the light source 101. The beam scanner 131 includes a tiltable reflector 171 configured to receive and angularly scan the image beam 111 to obtain an image in angular domain. The beam scanner 131 co-scans the ranging beam 121 together with the image beam 111, e.g. by directing both beams 111 and 121 onto the common tiltable reflector 171, whereby the ranging beam 121 angularly scans outside environment at the same time the image in angular domain is being rastered. Thus, the beam scanner 131 is a multi-beam scanner, one beam being the image beam 111, and one beam being the ranging beam 121.

A pupil-replicating lightguide 141, e.g. a lightguide plate with grating in- and out-couplers or a geometrical waveguide, may be coupled to the beam scanner 131. The pupil-replicating lightguide 141 conveys portions 111A of the scanned image beam 111 to an eyebox 159 of the wearable display device 100. The pupil-replicating lightguide 141 transmits the ranging beam 121 outside of the wearable display device 100, e.g. towards an outside object 104 located in the outside environment. A filter 106, e.g. IR-pass filter, may be placed in the path of the ranging beam 121 to block any residual image light 111 from leaking outside, so as to prevent others from seeing AR/VR images the user is seeing. A detector 151, e.g. a photodetector or a miniature digital camera, may be provided to receive a portion 121A of the first ranging beam 121A reflected from the outside object 104. The detector 151 may be equipped with an optical filter, similar to the filter 106, to improve the signal-to-noise ratio (SNR) and to prevent other light sources from saturating the detector 151.

A controller 108 may be operably coupled to the light source 101, the beam scanner 131, and the detector 151. The controller 108 may be configured to operate the beam scanner 131 in coordination with modulating the light source 101 in optical power level and/or color composition, to provide the image in angular domain as the image beam 111 is scanned by the beam scanner 131. In operation, the controller 108 receives a signal from the detector 151, the signal being representative of the reflected portion 121A of first ranging beam 121. The controller 108 has information about an instant angle of tilt of a tiltable reflector of the scanner 131. Therefore, the controller 108 has information about an output angle of the ranging beam 121. This enables the controller 108 to generate a three-dimensional (3D) representation of the outside environment as the controller scans the scanner 131 to provide the image to the viewer. In some embodiments, the controller 108 may determine a time delay between generating a light pulse of the ranging beam 121 and receiving the reflected pulse in the portion 121A. The time delay, corresponding to a sum of time of flight of the light pulse to the object 104 and time of flight of the reflected portion 121A to the detector 151, is representative of the distance from the wearable display device 100 and the outside object 104.

Figure 2A:
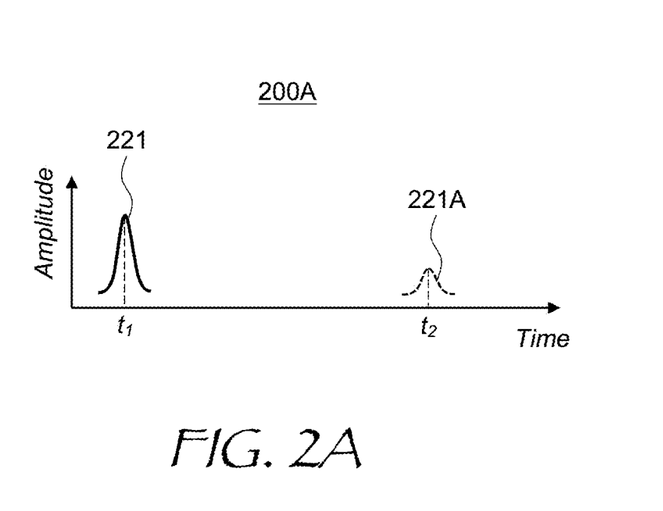
FIG. 2A is a time diagram illustrating relative positions of a ranging pulse and a detected reflection of the ranging pulse from an object in outside environment, for determining a distance to the object.
Figure 2B:
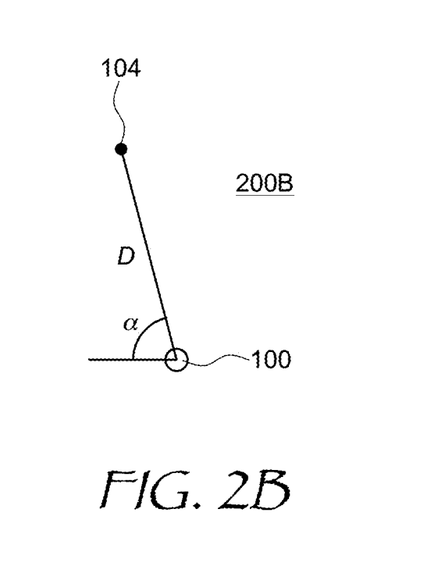
FIG. 2B is an angular diagram showing how the object may be located from an angle of scanning of the ranging beam and the determined distance.

FIGS. 2A and 2B illustrate the principle of determining location and distances to various objects in the outside environment using pulsed ranging beam rastering. A time diagram 200A of FIG. 2A illustrates the time of flight measurement principle. A ranging light pulse 221 of a succession of ranging light pulses is emitted at time $t_1$. A signal 221A representative of the portion 121A of the ranging beam 121 reflected by the object 104 is received at time $t_2$. The time interval $t_2-t_1$ represents the time of flight of the light from the wearable display device 100 to the object 104 and back. Distance D to the object 104 is therefore determined as $D=(t_2-t_1)2c$, where c is speed of light.

Turning to FIG. 2B, an angular diagram 200B depicts the known distance D and the known instantaneous rastering angle α at the time of sending out the ranging light pulse 221. Together, the distance D and the rastering angle α define position of the object 104 in space. When rastering is performed in two orthogonal directions, the position of the object 104 in 3D space may be determined.

Other methods of determining the distance D may include modulating the ranging beam 121 at a high frequency, and determining a phase shift between the modulation of the ranging beam 121 and the modulated reflections 121A of the ranging beam, the phase shift being representative of the time of flight of the light beam from the wearable display device 100 and the outside object 104. More generally, the controller 108 may be configured to cause the light source 101 to provide the ranging beam 121 that is time-variant, and to determine a distance to the object from a time and/or phase relationship between the time-variant ranging beam 121 and the signal received by the detector 151.

Figure 3:
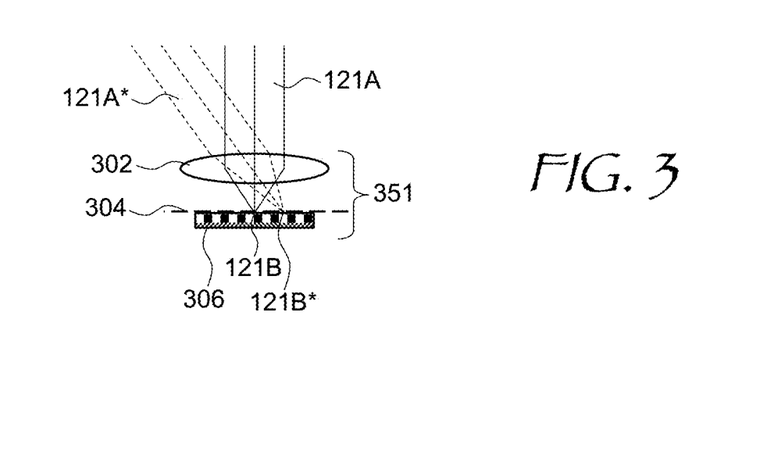
FIG. 3 is a schematic cross-sectional view of a detector embodiment of the wearable display device of FIG. 1.

In some embodiments, the distance D to an outside object may be determined by triangulation. FIG. 3 illustrates an example construction of the detector 151 of FIG. 1 suitable for triangulation-based distance measurements, ranging, and/or mapping. A detector 351 of FIG. 3 includes an objective 302 for focusing the reflected ranging beam portion 121A at a focal plane 304, and a photodetector array 306 at the focal plane 304 for detecting the focused first ranging beam portion 121A. A beam angle of the reflected ranging beam portion 121A may be determined from the position of the focused ranging beam portion on the photodetector array 306. In the example shown in FIG. 3, the ranging beam portion 121A impinges at the detector 351 at a normal angle of incidence, forming a focal spot 121B at the center of the photodetector array 306. For a comparison, a ranging beam portion 121A* impinges at the detector 351 at an acute angle of incidence, forming a focal spot 121B* closer to an edge of the photodetector array 306. Thus, the location of the focal spot, i.e. coordinates of a center of an image of the focal spot on the photodetector array 306, bears information about the impinging beam angle.

Figure 4:
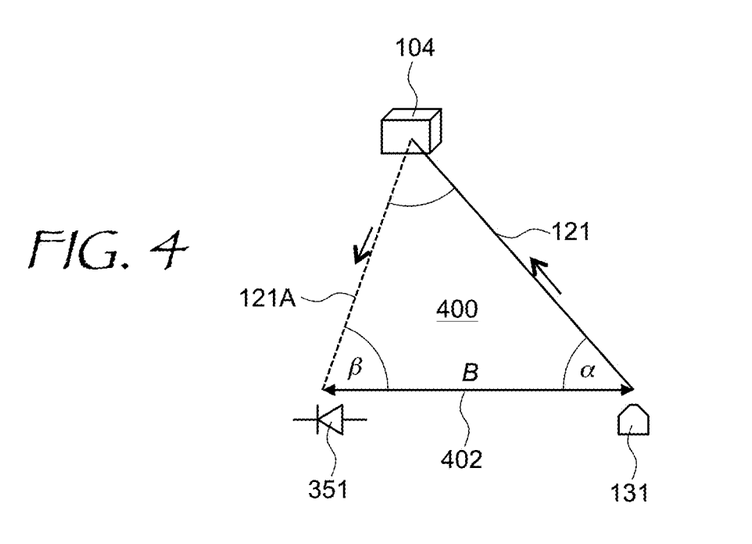
FIG. 4 is a triangulation diagram illustrating how the location of the object in the outside environment may be located using the detector of FIG. 3.

Referring now to FIG. 4, the detector 351 is disposed at a base 402 distance B from the beam scanner 131 at a moment of time when the beam scanner 131 illuminates the object 104 with the ranging beam 121. The portion 121A of the ranging beam 121 reflected from the object 104 impinges onto the detector 351 of FIG. 3. The base 402, the ranging beam 121, and the reflected ranging beam portion 121A form a triangle 400. The angle α at the beam scanner is known, it is defined by an instantaneous tilt angle of the tiltable reflector 171 (FIG. 1). The angle β the detector 351 can be determined from the position of the focused ranging beam portion 121B on the photodetector array 306, as explained above with reference to FIG. 3. Together with the known base 204 distance B, the angles α and β fully define the triangle 400. A location of the object 104 in the outside environment relative to the wearable display device 100 may be determined trigonometrically.

Figure 5A:
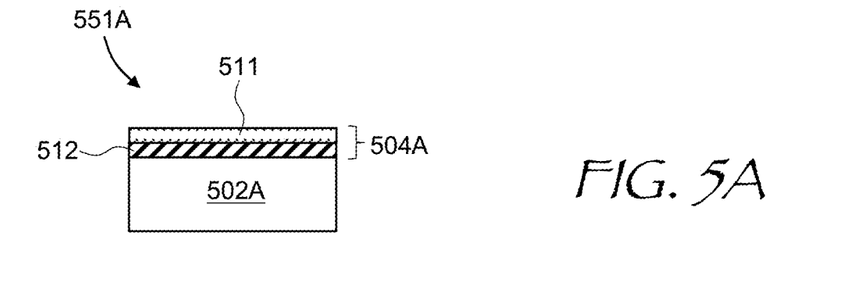
FIG. 5A is a side cross-sectional view of a polarization-selective detector of this disclosure.

Referring to FIG. 5A, a polarization-selective detector 551A may be used as the detector 151 of the wearable display device 100 of FIG. 1. The polarization-selective detector 551A of FIG. 5A includes a photodetector 502A, e.g. a photodiode, optically coupled to a polarization component 504A such as, for example, a linear or circular polarizer, or a waveplate 511 coupled to a polarizer 512. The purpose of the polarization component 504A is to transmit to the photodetector 502A a polarization component of impinging light while blocking an orthogonal polarization component. Such a measurement configuration may be advantageously used e.g. to improve signal to noise ratio when the ranging beam 121 is polarized. In some embodiments, an optical filter may also be provided, with a transmission bandwidth centered at a center wavelength of the ranging beam 121.

Figure 5B:
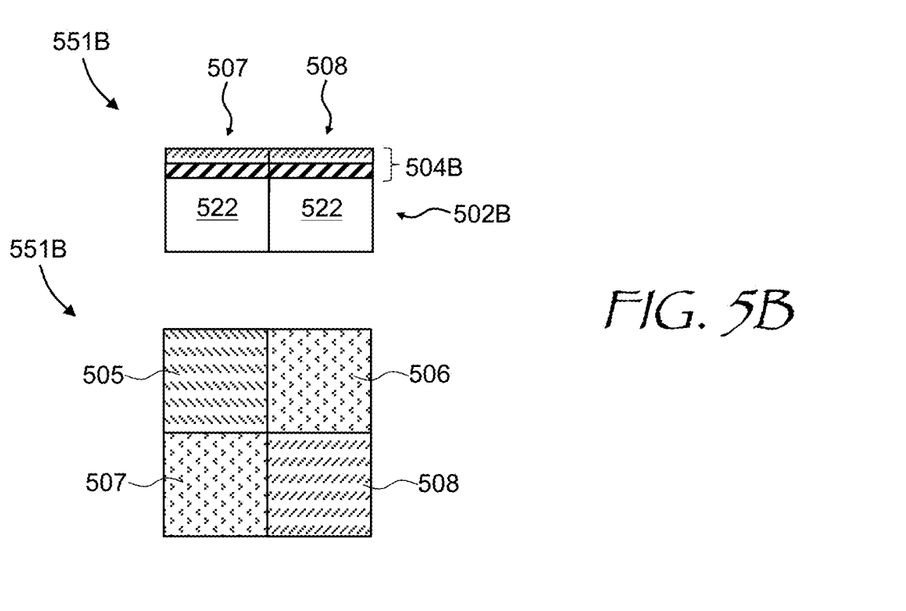
FIG. 5B includes side and top views of a multichannel polarization selective detector of this disclosure.

Referring now to FIG. 5B, a multichannel polarization-selective detector 551B may function as the detector 151 of the wearable display device 100 of FIG. 1. The multichannel polarization-selective detector 551B of FIG. 5B includes a quadrant photodetector 502B, e.g. a quad of photodiodes 522, optically coupled to a polarization component array 504B such as, for example, a set of waveplates/polarizers 505, 506, 507, and 508 at different orientations of optic axes. Each photodiode 522 of the quadrant photodetector 502B may be coupled to a particular waveplate and polarizer 505, 506, 507, or 508 with axis different angles 505, 506, 507, or 508 Together, the multichannel polarization-selective detector 551B enables one to determine the polarization state of impinging light, including a degree of polarization, retardance, polarization angle, diattenuation, etc.

Figure 6A:
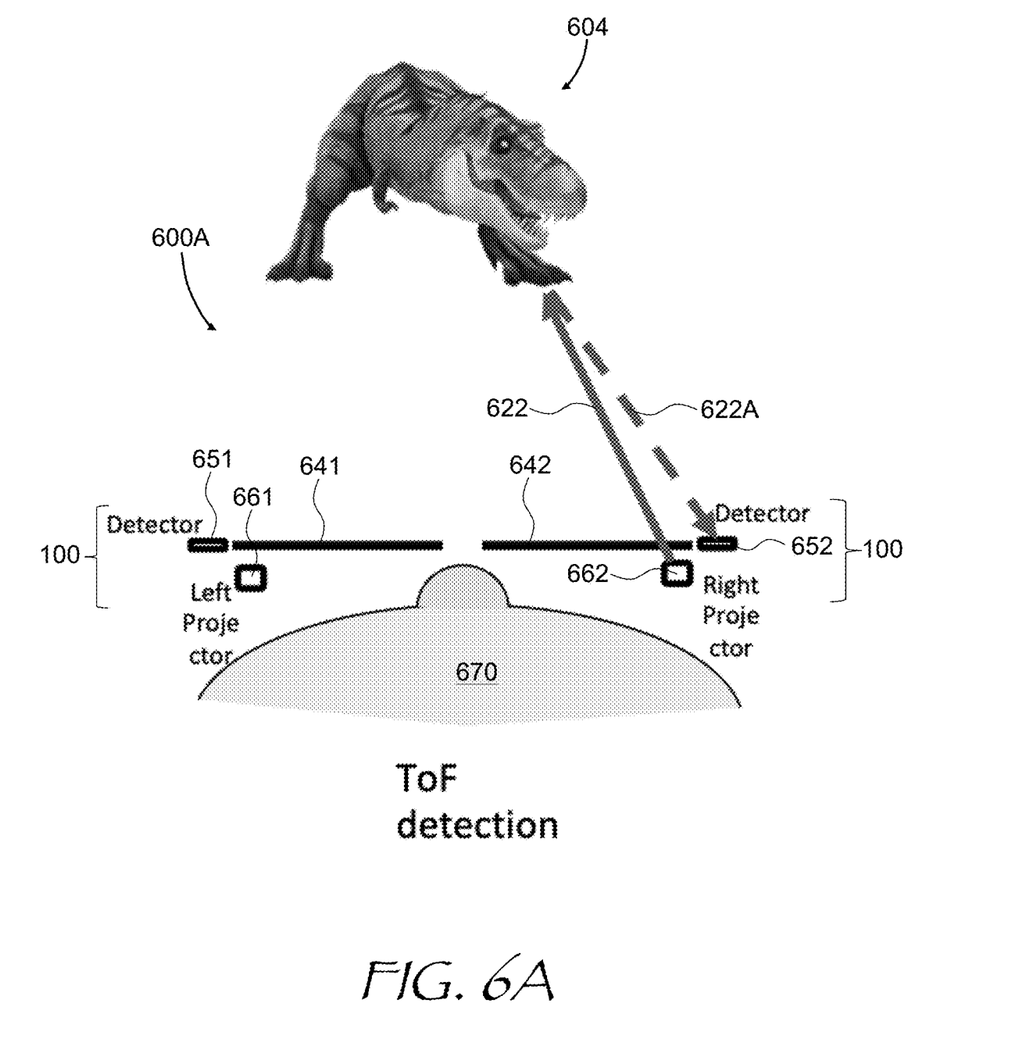
FIG. 6A is a schematic view of a wearable display device with a time-of-flight (ToF) ranging system.

Referring to FIG. 6A with further reference to FIG. 1, a wearable AR/VR display device 600A includes two display devices, one for each eye, to provide stereoscopic vision. At least one display device may be the ranging wearable display device 100 of FIG. 1. In the example shown in FIG. 6A, the wearable AR/VR display device 600A includes two ranging wearable display devices 100 of FIG. 1. A common controller, not shown for brevity, may be provided for both display devices 100. The wearable display device 600A of FIG. 6A includes a left projector 661 having a first light source and a first beam scanner, and a right projector 662 having a second light source and a second beam scanner. The wearable display device 600A further includes a first pupil-replicating lightguide 641 coupled to the first beam scanner for conveying portions of the first image beam scanned by the first beam scanner to a left eye of a user 670, and a second pupil-replicating lightguide 642 coupled to the second beam scanner for conveying portions of the second image beam scanned by the second beam scanner to a right eye of the user 670. The wearable AR/VR display device 600A further includes first 651 and second 652 detectors adjacent the left 661 and right 662 projectors, respectively, receiving portions of ranging beams scanned by the corresponding projectors. For example, the second photodetector 652 receives a portion 622A of the second ranging beam 622. A time delay between generating a light pulse of the second ranging beam 622 and receiving the reflected pulse in the portion 622A is equal to round-trip time of flight (ToF) of the light between the wearable AR/VR display device 600A and an external object 604. Therefore, the ToF is representative of the distance from the AR/VR display device 600A and the external object 604, enabling 3D rendering of an external environment to be performed. Having two ranging projectors 661 and 662 enables one to improve fidelity of the information being received, and/or to increase the scanning range, by making the ranging projectors 661 and 662 scan different areas of a field of view, with an overlap in the middle.

The controller of the wearable AR/VR display device 600A may be suitably configured, e.g. programmed, hard-wired, etc., to operate the scanners of the left 661 and right 662 projectors, to cause the light sources of the left 661 and right 662 projectors to provide the first and second image beams, respectively, with at least one of a time-varying power level or a time-varying color composition to provide the left and right images in angular domain, respectively, as the first and second image beams are scanned by the respective beam scanners. Then, the controller may receive first and second signals from the first 651 and second 652 detectors, respectively, the first and second signals being representative of the reflected portions of the first and second ranging beams, respectively.

Figure 6B:
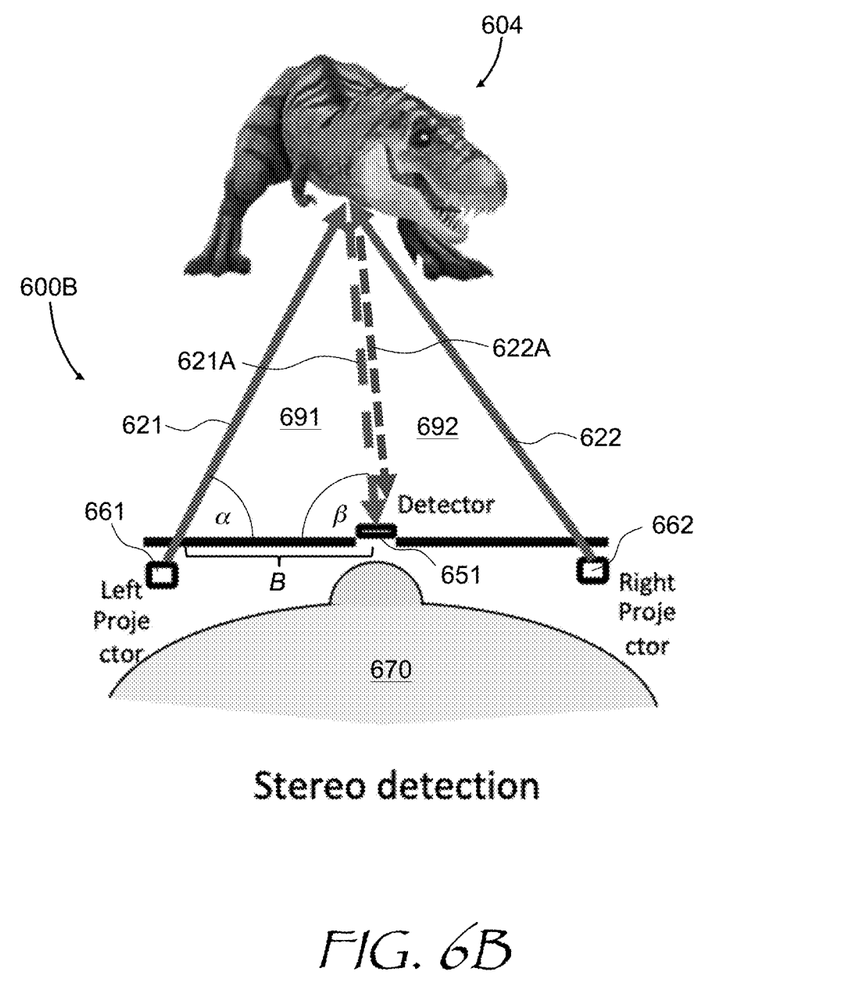
FIG. 6B is a schematic view of a wearable display device with a stereo detection based ranging system with two scanning beams and one detector.

Turning to FIG. 6B, a wearable AR/VR display device 600B includes two display devices with left 661 and right 662 projectors providing first 621 and second 622 ranging beams. A common photodetector 651, which may be disposed between the left 661 and right 662 projectors or beam scanners, can receive light portions 621A, 621B reflected from the external object 604 illuminated with the first 621 and second 622 ranging beams, respectively.

The controller of the wearable AR/VR display device 600B may be configured to cause the light sources of the left 661 and right 662 projectors to provide the first and second image beams, respectively, having at least one of a time-varying power level or a time-varying color composition, to provide the first and second images in angular domain, respectively, as the first and second image beams are scanned by the first and second beam scanners, respectively. The controller may be further configured to receive first and a second signals from the detector 651, the first and second signals being representative of the reflected portions 621A and 622A of the first 621 and second 622 ranging beams, respectively. The timing of the first 621 and second 622 ranging beams may be selected such that reflected signal from only one of the first 621 and second 622 ranging beams may be received at any given moment of time, enabling one to discriminate between the light portions 621A, 621B reflected by the external object 604 illuminated with the first 621 and second 622 ranging beams, respectively. Left and right images of the external object 604 may then be rendered separately for each ranging beam 621 and 622. The left and right images may be compared in software to determine the parallax and confirm the distance to the external object 604.

The detector 651 may be angle-sensitive. To that end, the photodetector 651 may include a lens and a photodetector array behind the lens, similarly to the detector 351 of FIG. 3. The number or position of a pixel in the photodetector array is representative of the angle the reflection came from. This enables 3D mapping by triangulation, since angles $\alpha$ and $\beta$ and a base length 683 of a first triangle 691 formed by the photodetector 651, the left projector 661, and the outside object 604 are known. A second triangle 692 is formed by the photodetector 651, the right projector 662, and the object 604, and similar triangulation may also be performed for that triangle as well, as explained above with reference to FIG. 4.

Figure 6C:
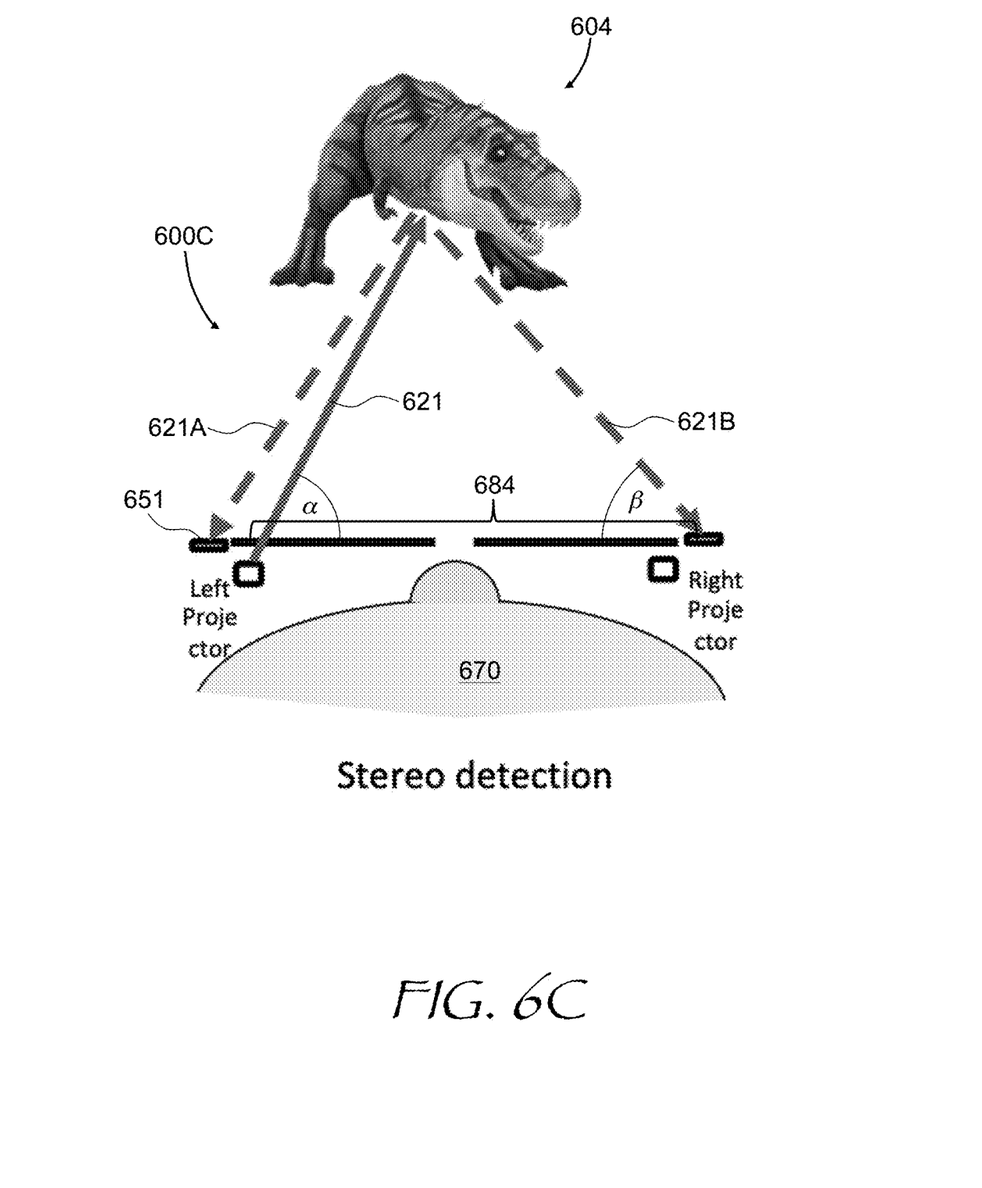
FIG. 6C is a schematic view of a wearable display device with a stereo detection based ranging system with one scanning beam and two detectors.

A similar triangulation concept may be applied in a wearable AR/VR display device 600C of FIG. 6C. The wearable AR/VR display device 600C includes only one projector 661 capable of scanning outside environment with the first ranging beam 621. Two angular-sensitive detectors, e.g. the detector 351 of FIG. 3, are provided to detect first 621A and second 621B reflections. A distance to the external object 604 may be computed by triangulation from a known base length 684 and the base angles $\alpha$ and $\beta$, as explained above with reference to FIG. 4.

Figure 7:
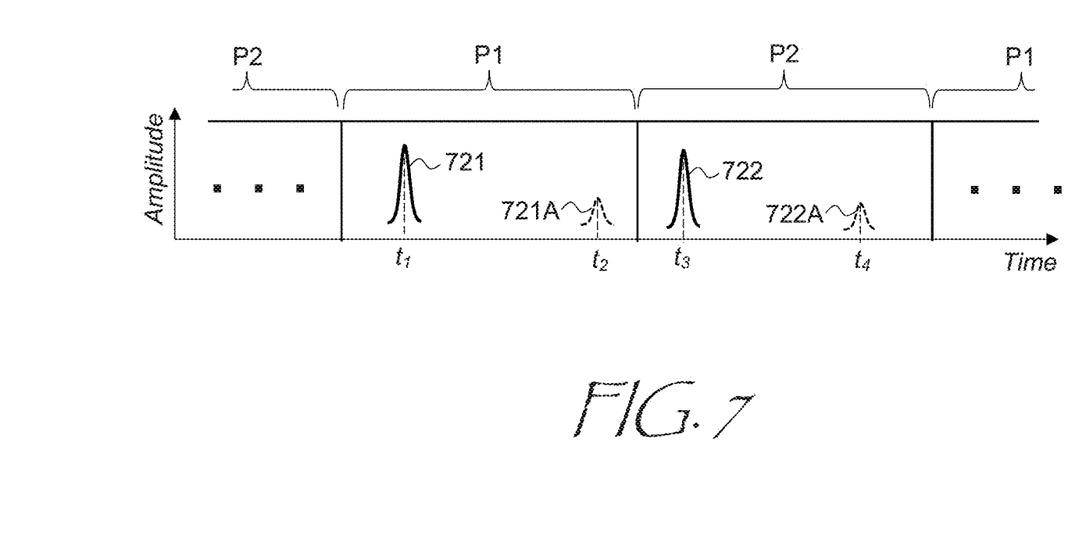
FIG. 7 is a time diagram illustrating time-of-flight ranging with two ranging beams and one detector.

Whenever time-of-flight measurements are used to determine the location of an outside object using two ranging beams and two detectors of a wearable display e.g. as presented in FIG. 6A, the two measurements by the two ranging systems may be separated in time domain. Referring to FIG. 7 with further reference to FIG. 6A, the left projector 661 emits a ranging pulse 721 at a time $t_1$ belonging to a first time period P1. The left detector 651 receives the reflected portion 721A of the ranging pulse 721 at a time $t_2$ belonging to the same first time period P1. Similarly, the right projector 662 emits a ranging pulse 722 of the ranging beam 622 at a time $t_3$ belonging to a second time period P2. The right detector 652 receives the reflected portion 722A of the ranging pulse 722 at a time $t_4$ belonging to the same second time period P2. The process repeats within the interleaved first and second time periods P1 and P2, as illustrated in FIG. 7. Since the first and second time periods P1 and P2 are separated from one another, the cross-signaling when the left detector 651 receives the reflected ranging beam portion 622A and vice versa, is precluded from happening.

Figure 8:
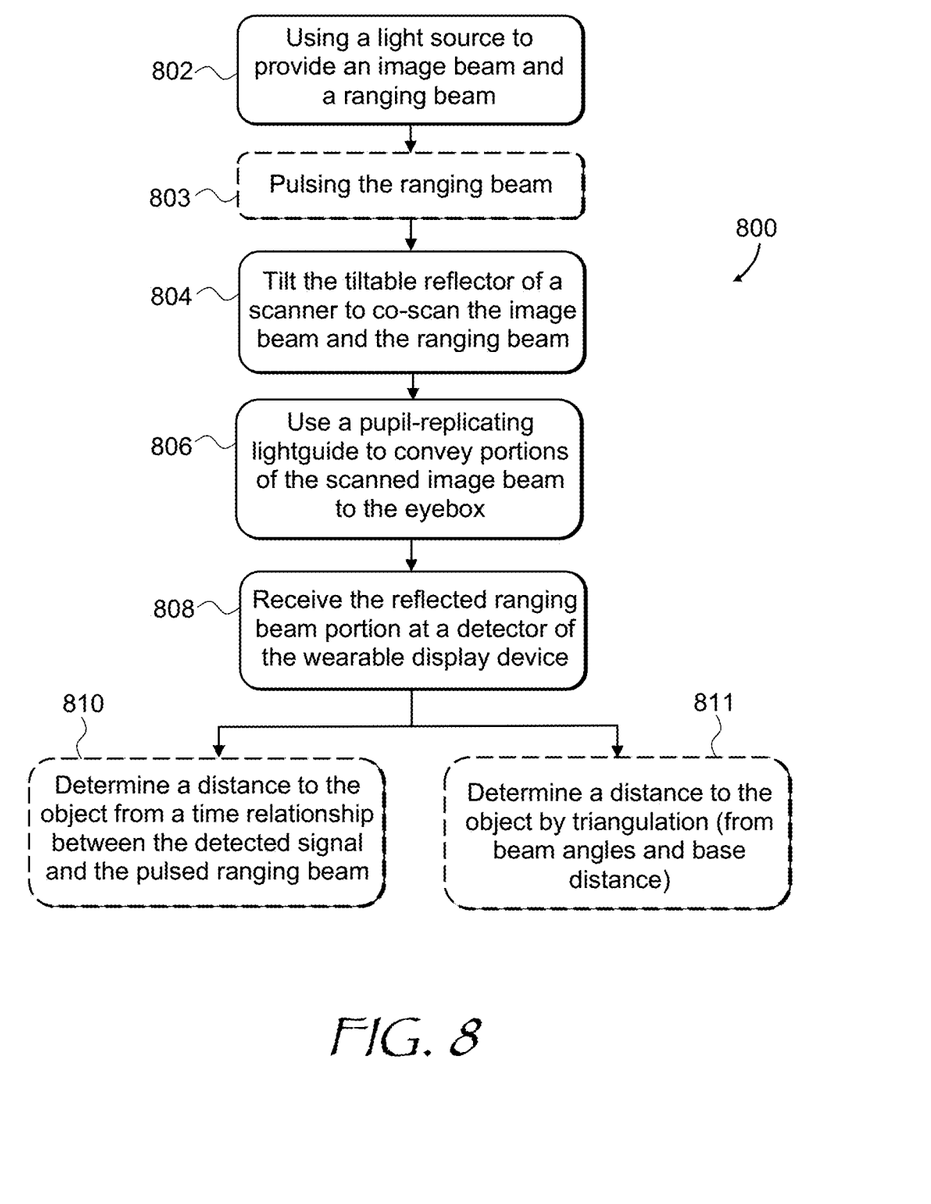
FIG. 8 is a flow chart of a method for displaying an image to a viewer while scanning outside environment, in accordance with this disclosure.

Referring now to FIG. 8 with further reference to FIG. 1, a method 800 (FIG. 8) for displaying an image to a viewer while scanning outside environment may be implemented in the controller 108 of the wearable display device 100 (FIG. 1). The method 800 includes using a light source (802), e.g. the light source 101 of the wearable display device 100 of FIG. 1, to provide an image beam (e.g. the image beam 111) and a ranging beam (e.g. the ranging beam 121). A tiltable reflector of a scanner, e.g. the tiltable reflector 171 of the scanner 131, is tilted (804) to angularly scan the image beam 111 to obtain an image in angular domain, and to angularly co-scan the ranging beam 121 to sense the outside environment. A pupil-replicating lightguide, e.g. the pupil-replicating lightguide 141 coupled to the beam scanner 131, is used (806) to convey portions 111A of the image beam 111 scanned by the beam scanner 131 to the eyebox 159 of the wearable display device 100.

A detector, e.g. the detector 141, is used to receive (808) the portion 121A of the ranging beam 121 reflected from the object 104 in the outside environment. Using the detector for receiving the portion of the ranging beam may include receiving a signal representative of the reflected portion 121A of the ranging beam 121, e.g. an electrical signal, by the controller 108. In some embodiments, the step 802 of using the light source to provide the image beam comprises causing the light source 101 to provide the image beam 111 with a time-varying power level and/or a time-varying color composition, to provide the image in angular domain as the image beam 111 is angularly scanned by the beam scanner 131.

The method 800 may further include pulsing the ranging beam 121, as denoted by a dashed box 803. The pulsing may be achieved by e.g. pulsing the infrared laser diode emitting the ranging beam 121, or by using an external modulator. In embodiments where the ranging beam 121 is pulsed, the method 800 may further include determining (dashed box 810) a distance to the object 104 from a time relationship between the signal and the pulsed ranging beam 121, e.g. from the time delay $t_2-t_1$ as was explained above with reference to FIGS. 2A and 2B.

In embodiments based on triangulation-based ranging, e.g. the ones presented in FIGS. 3 and 4, the detector 351 is disposed at the base distance B from the beam scanner 131 emitting the ranging beam 121. The detector 351 (FIG. 3) includes the objective 302 for focusing the ranging beam portion 121A at the focal plane 304 and the photodetector array 306 at the focal plane 304. The photodetector array 306 detects the focused ranging beam portion 121B. In such embodiments, the method 800 may further include determining (dashed box 811) the distance to the object from the position of the focused ranging beam portion 121B on the photodetector array 306, which give the beam angle of the detected beam portion 121A, and the known base distance B, as illustrated in FIG. 4.

Figure 9:
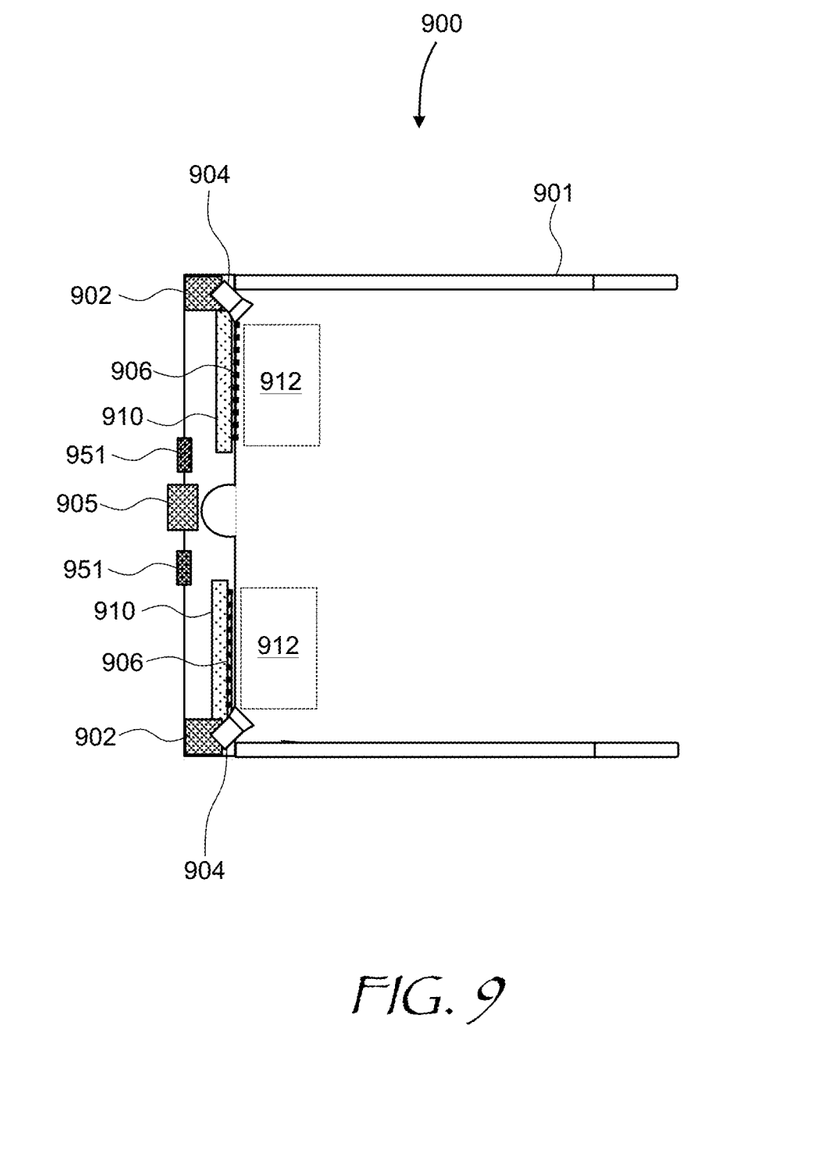
FIG. 9 is a schematic top view of a near-eye display using beam scanners/display devices of this disclosure.

Turning to FIG. 9, a near-eye display (NED) 900 is an embodiment of the AR/VR displays 600A to 600C of FIGS. 6A to 6C, for example. The NED 900 includes a frame 901 having a form factor of a pair of glasses. The frame 901 may support, for each eye: a projector 902 for providing display light carrying an image in angular domain, a pupil replicator 910, e.g. a pupil-replicating waveguide, optically coupled to the projector 902, an eye-tracking camera 904, and a plurality of illuminators 906. The illuminators 906 may be supported by the pupil replicator 910 for illuminating an eyebox 912. Each projector 902 may include a beam scanner with a ranging light beam e.g. a beam in an infrared wavelength range as described herein. At least one photodetector 951 may be provided for detecting reflections of the ranging beam. The photodetector 951 may be angular-selective to be able to do triangulation as described herein.

The tiltable reflector of the projector 902 may include a MEMS tiltable reflector, for example. Light sources for these projectors may include a substrate supporting an array of single-emitter or multi-emitter semiconductor light sources, e.g. side-emitting laser diodes, vertical-cavity surface-emitting laser diodes, SLEDs, or light-emitting diodes, for providing a plurality of light beams. Collimators of the light sources may include concave mirrors, bulk lenses, Fresnel lenses, holographic lenses, freeform prisms, etc. The pupil replicators 910 may include waveguides equipped with a plurality of surface relief and/or volume holographic gratings. The function of the pupil replicators 910 is to provide multiple laterally offset copies of the display light beams provided by the projectors 902 at respective eyeboxes 912.

A controller 905 is operably coupled to the light sources and tiltable reflectors of the projectors 902. The controller 905 may be configured to determine the X- and Y-tilt angles of the tiltable reflectors of the projectors 902. The controller 905 determines which pixel or pixels of the image to be displayed correspond to the determined X- and Y-tilt angles.

Then, the controller 905 determines the brightness and/or color of these pixels to produce light pulses at power level(s) corresponding to the determined pixel brightness and color. The controller 905 may also perform the ranging operations in sync with scanning the displayed images, as disclosed herein.

The purpose of the eye-tracking cameras 904 is to determine position and/or orientation of both eyes of the user. Once the position and orientation of the user's eyes are known, a gaze convergence distance and direction may be determined. The imagery displayed by the projectors 902 may be adjusted dynamically to account for the user's gaze, for a better fidelity of immersion of the user into the displayed augmented reality scenery, and/or to provide specific functions of interaction with the augmented reality. In operation, the illuminators 906 illuminate the eyes at the corresponding eyeboxes 912, to enable the eye-tracking cameras to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 912.

Figure 10:
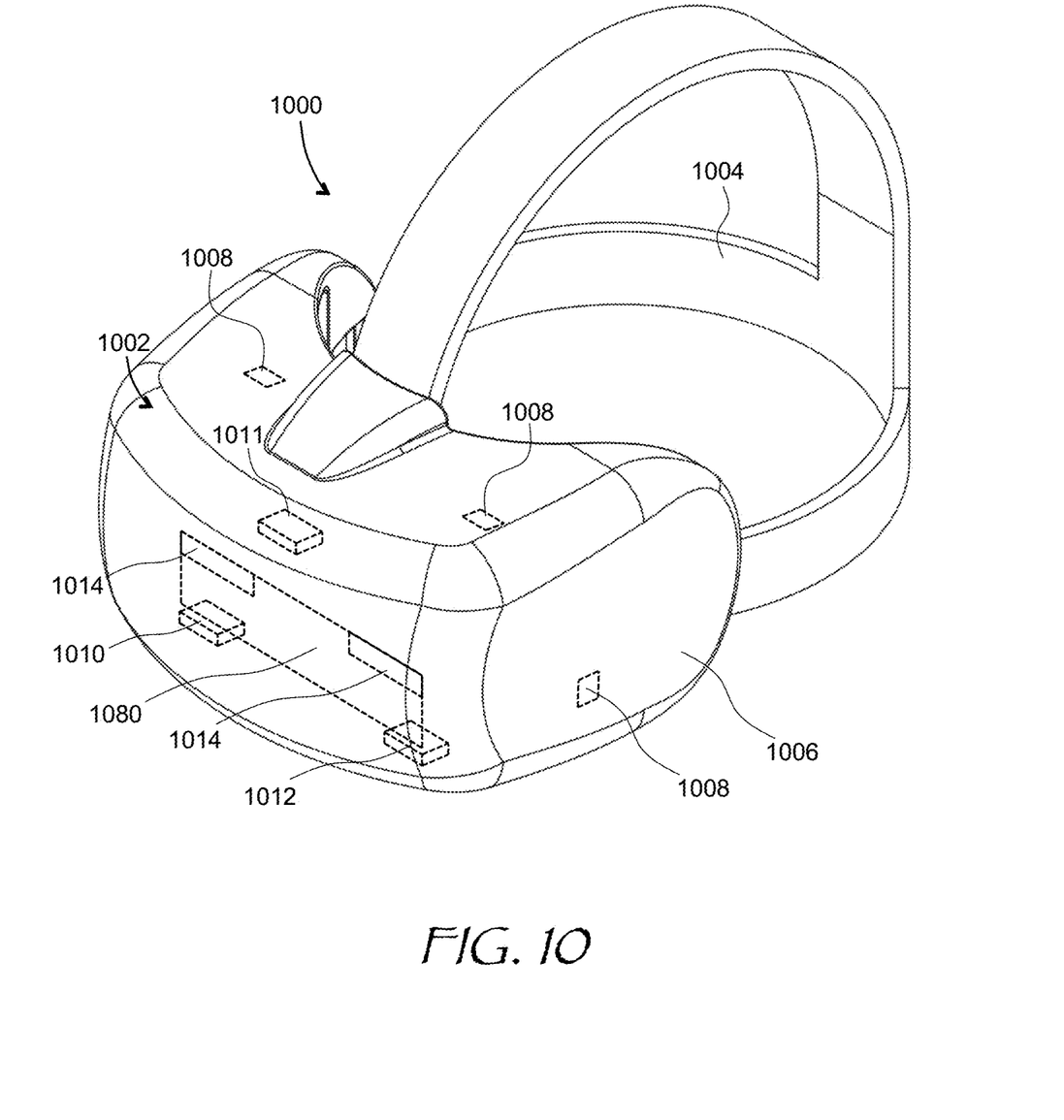
FIG. 10 is an isometric view of a head-mounted display of this disclosure.

Referring to FIG. 10, an HMD 1000 is an example of an AR/VR wearable display system which encloses the user's face, for a greater degree of immersion into the AR/VR environment. The HMD 1000 is an embodiment of the AR/VR displays 600A to 600C of FIGS. 6A to 6C, for example. The function of the HMD 1000 is to augment views of a physical, real-world environment with computer-generated imagery, and/or to generate the entirely virtual 3D imagery. The HMD 1000 may include a front body 1002 and a band 1004. The front body 1002 is configured for placement in front of eyes of a user in a reliable and comfortable manner, and the band 1004 may be stretched to secure the front body 1002 on the user's head. A display system 1080 may be disposed in the front body 1002 for presenting AR/VR imagery to the user. Sides 1006 of the front body 1002 may be opaque or transparent.

In some embodiments, the front body 1002 includes locators 1008 and an inertial measurement unit (IMU) 1010 for tracking acceleration of the HMD 1000, and position sensors 1012 for tracking position of the HMD 1000. The IMU 1010 is an electronic device that generates data indicating a position of the HMD 1000 based on measurement signals received from one or more of position sensors 1012, which generate one or more measurement signals in response to motion of the HMD 1000. Examples of position sensors 1012 include: one or more accelerometers, one or more gyroscopes, one or more magnetometers, another suitable type of sensor that detects motion, a type of sensor used for error correction of the IMU 1010, or some combination thereof. The position sensors 1012 may be located external to the IMU 1010, internal to the IMU 1010, or some combination thereof.

The locators 1008 are traced by an external imaging device of a virtual reality system, such that the virtual reality system can track the location and orientation of the entire HMD 1000. Information generated by the IMU 1010 and the position sensors 1012 may be compared with the position and orientation obtained by tracking the locators 1008, for improved tracking accuracy of position and orientation of the HMD 1000. Accurate position and orientation is important for presenting appropriate virtual scenery to the user as the latter moves and turns in 3D space.

The HMD 1000 may further include a dedicated depth camera assembly (DCA) 1011, which captures data describing depth information of a local area surrounding some or all of the HMD 1000. To that end, the DCA 1011 may include a laser radar (LIDAR), or a similar device. The depth information may be compared with the information from the IMU 1010, for better accuracy of determination of position and orientation of the HMD 1000 in 3D space.

The HMD 1000 may further include an eye tracking system 1014 for determining orientation and position of user's eyes in real time. The obtained position and orientation of the eyes also allows the HMD 1000 to determine the gaze direction of the user and to adjust the image generated by the display system 1080 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1002.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A wearable display device comprising:
   a first light source that provides both a first image beam and a first ranging beam;
   a first beam scanner comprising a tiltable reflector that receives and angularly scans the first image beam to obtain a first image in angular domain, and that receives and angularly scans the first ranging beam, whereby:
the tiltable reflector is tilted to direct the first ranging beam toward an outside environment to scan an object in the outside environment, and
the tiltable reflector is tilted to direct the first image beam toward receiving components inside the wearable display device;
a first pupil-replicating lightguide that conveys portions of the first image beam scanned by the first beam scanner to a first eyebox of the wearable display device; and
a first detector that receives a portion of the first ranging beam reflected from the object in the outside environment.

2. The wearable display device of claim 1, further comprising a controller operably coupled to the first light source, the first beam scanner, and the first detector, and configured to:
operate the first beam scanner;
cause the first light source to provide the first image beam having at least one of a time-varying power level or a time-varying color composition to provide the first image in angular domain as the first image beam is scanned by the first beam scanner; and
receive a first signal from the first detector, the first signal being representative of the portion of the first ranging beam reflected by the object.

3. The wearable display device of claim 2, wherein the controller is further configured to
cause the first light source to provide the first ranging beam, wherein the first ranging beam is time-variant; and
to determine a distance to the object from at least one of time or phase relationship between the time-variant first ranging beam and the first signal.

4. The wearable display device of claim 3, wherein the time-variant first ranging beam comprises a succession of ranging light pulses, wherein the controller is configured to determine the distance to the object from a time delay between emitting a pulse of the ranging light pulses and receiving the first signal.

5. The wearable display device of claim 2, wherein:
the first detector is disposed at a base distance from the first beam scanner;
the first detector comprises an objective for focusing the first ranging beam portion at a focal plane and a photodetector array at the focal plane for detecting the focused first ranging beam portion; and
the controller is further configured to determine the distance to the object from: position of the focused first ranging beam portion on the photodetector array; and the base distance.

6. The wearable display device of claim 5, wherein the controller is configured to determine a beam angle of the received first ranging beam portion from the position of the focused first ranging beam portion, and to determine the distance by triangulation based on a beam angle of the first ranging beam, the beam angle of the received first ranging beam portion, and the base distance.

7. The wearable display device of claim 1, wherein the first detector comprises:
a polarization component comprising at least one of a polarizer or a waveplate, configured to receive the reflected portion of the first ranging beam; and
a photodetector optically coupled to the polarization component.

8. The wearable display device of claim 1, further comprising:
a second light source for providing a second image beam and a second ranging beam;
a second beam scanner coupled to the second light source for receiving and angularly scanning the second image beam to obtain a second image in angular domain, and for receiving and angularly scanning the second ranging beam, whereby the second ranging beam scans the outside environment; and
a second pupil-replicating lightguide coupled to the second beam scanner for conveying the second image beam to a second eyebox of the wearable display device.

9. The wearable display device of claim 8, wherein the first detector is configured for receiving a portion of the second ranging beam reflected from the object.

10. The wearable display device of claim 9, wherein the first detector is disposed between the first and second beam scanners.

11. The wearable display device of claim 9, further comprising a controller operably coupled to the first and second light sources, the first and second beam scanners, and the first detector, and configured to:
operate the first and second beam scanners;
cause the first and second light sources to provide the first and second image beams, respectively, having at least one of a time-varying power level or a time-varying color composition to provide the first and second images in angular domain, respectively, as the first and second image beams are scanned by the first and second beam scanners, respectively; and
receive first and a second signals from the first detector, the first and second signals being representative of the reflected portions of the first and second ranging beams, respectively, wherein the controller is configured to discriminate between the first and second signals based on timing of the first and second signals w.r.t timing of emitting the first and second ranging beams.

12. The wearable display device of claim 8, further comprising a second detector for receiving a portion of the second ranging beam reflected from the object.

13. The wearable display device of claim 12, further comprising a controller operably coupled to the first and second light sources, the first and second beam scanners, and the first detector, and configured to:
operate the first and second beam scanners;
cause the first and second light sources to provide the first and second image beams, respectively, with at least one of a time-varying power level or a time-varying color composition to provide the first and second images in angular domain, respectively, as the first and second image beams are scanned by the first and second beam scanners, respectively; and
receive first and second signals from the first and second detectors, respectively, the first and second signals being representative of the reflected portions of the first and second ranging beams, respectively.

14. A method for displaying an image to a viewer while scanning an outside environment, the method comprising:
using a light source, of a display device, that provides both an image beam and a ranging beam;
tilting a tiltable reflector of a beam scanner thereby angularly scanning the image beam toward receiving components inside the display device, to obtain an image in angular domain, and tilting the tiltable reflector toward the outside environment thereby angularly scanning the ranging beam to scan the outside environment;

using a pupil-replicating lightguide coupled to the beam scanner that conveys portions of the image beam scanned by the beam scanner to an eyebox of a wearable display device; and using a detector that receives a portion of the ranging beam reflected from the outside environment.

15. The method of claim 14, wherein:

using the light source to provide the image beam comprises causing the light source to provide the image beam with at least one of a time-varying power level or a time-varying color composition, to provide the image in angular domain as the image beam is angularly scanned by the beam scanner; and using the detector for receiving the portion of the ranging beam comprises receiving a signal representative of the reflected portion of the ranging beam.

16. The method of claim 15, further comprising:

pulsing the ranging beam; and determining a distance to the object from a time relationship between the signal and the pulsed ranging beam.

17. The method of claim 15, wherein:

the detector is disposed, on the display device, at a base distance from the beam scanner;

the detector comprises an objective for focusing the ranging beam portion at a focal plane and a photodetector array at the focal plane for detecting the focused ranging beam portion; and the method further comprises determining the distance to an object from: position of the focused ranging beam portion on the photodetector array; and the base distance.

18. A non-transitory computer-readable storage medium storing instructions, for displaying an image to a viewer while scanning an outside environment, the instructions, when executed by a computing system, cause the computing system to:

use a light source, of a display device, that provides both an image beam and a ranging beam;

tilt a tiltable reflector of a beam scanner thereby angularly scanning the image beam toward receiving components inside the display device, to obtain an image in angular domain, and tilting the tiltable reflector toward the outside environment thereby angularly scanning the ranging beam to scan the outside environment;

use a pupil-replicating lightguide coupled to the beam scanner that conveys portions of the image beam scanned by the beam scanner to an eyebox of a wearable display device; and us a detector that receives a portion of the ranging beam reflected from the outside environment.

19. The non-transitory computer-readable storage medium of claim 18, wherein:

using the light source to provide the image beam comprises causing the light source to provide the image beam with at least one of a time-varying power level or a time-varying color composition, to provide the image in angular domain as the image beam is angularly scanned by the beam scanner; and using the detector for receiving the portion of the ranging beam comprises receiving a signal representative of the reflected portion of the ranging beam.

20. The non-transitory computer-readable storage medium of claim 19, wherein the instructions, when executed, further cause the computing system to:

pulse the ranging beam; and determine a distance to the object from a time relationship between the signal and the pulsed ranging beam.

* * * * *